Figure 1:
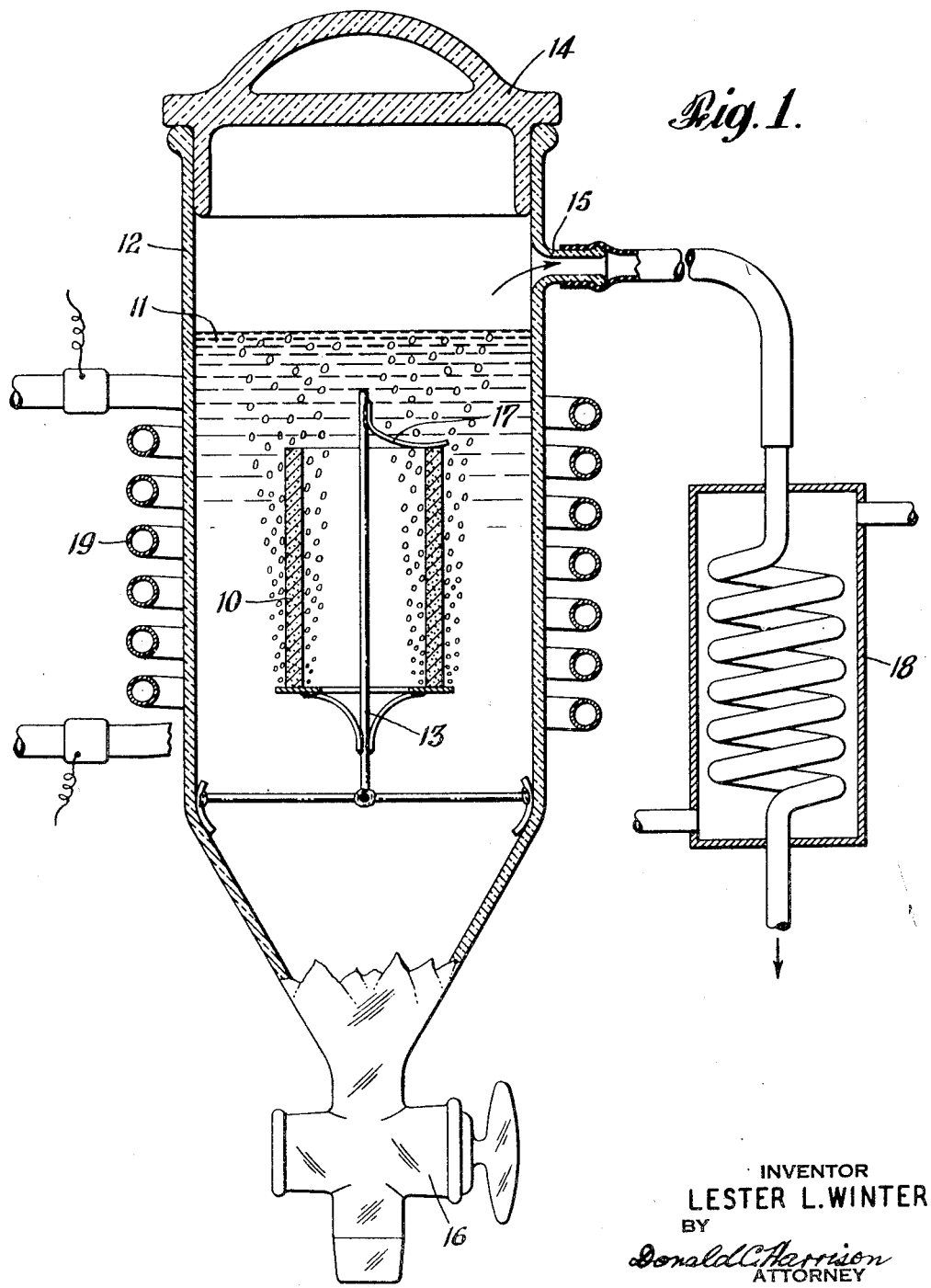

Oct. 31, 1950     L. L. WINTER     2,527,666
CLEANING CARBON ARTICLES

Filed May 22, 1945     2 Sheets-Sheet 1

INVENTOR
LESTER L. WINTER
BY
Donald C. Harrison
ATTORNEY

Patented Oct. 31, 1950

2,527,666

UNITED STATES PATENT OFFICE 2,527,666

CLEANING CARBON ARTICLES

Lester L. Winter, Lakewood, Ohio, assignor, by mesne assignments, to Union Carbide and Carbon Corporation, a corporation of New York Application May 22, 1945, Serial No. 595,175

5 Claims. (Cl. 134—1)

This invention relates to carbon articles, referring more particularly to a method of cleaning machined carbon articles such as electrodes for use in electron discharge devices.

The physical and chemical properties of carbon are such as to make it a particularly desirable material for use as electrodes in electron discharge devices. Usually such electrodes are machined from either "amorphous" carbon or "graphitic" carbon electrode stock. The machining operation produces dust which adheres to the finished electrode, not only on its surfaces, but also in the numerous pores and crevices customarily found in carbon articles. Furthermore, machining tends to produce a surface layer of partially dislodged particles. If a carbon electrode contaminated with dust and having such damaged surfaces is sufficiently heated during use in an electron discharge device, tiny particles of carbon and dust are forcibly ejected from it, causing irregularity in the operation of the device. It is accordingly necessary to remove dust from carbon electrodes before they can be satisfactorily used in electron discharge devices.

One proposed method of removing dust from carbon electrodes comprises a step of heating the electrodes to a white heat in an oxidizing atmosphere. Although this method removes perhaps the greater part of the dust ordinarily adhering to carbon electrodes, the articles so treated suffer from harmful oxidation.

The gas-adsorptive power of carbon makes it necessary that carbon electrodes for electron discharge devices be thoroughly degassed before use, for discharge of gas during use would impair the operation of the device. Degassing is usually accomplished by a second treatment after dust has been removed.

It is the principal object of this invention to provide a method of cleaning carbon articles to remove dust from such articles without damaging them. Another object of the invention is a method of treatment which facilitates easier removal of gas from carbon articles.

These objects are achieved by the invention which is a method comprising the steps of immersing a machined carbon article to be cleaned in a vaporizable liquid which is inert to carbon in both the liquid state and the vapor state, and heating the article to a temperature well above that at which the liquid vaporizes rapidly, without otherwise heating the liquid, thereby causing the liquid to boil violently adjacent to the surfaces of the article. The violent ebullition of vapor adjacent to the carbon article causes the removal of dust particles from its surfaces, and furthermore, since there is some penetration of liquid into the pores and crevices normally present in carbon articles, vigorous expulsion of vapor causes removal of dust particles from such pores and crevices. By continued heating it is possible to remove substantially all of the partially dislodged particles of carbon from surfaces which have been damaged by machining.

Figure 2:
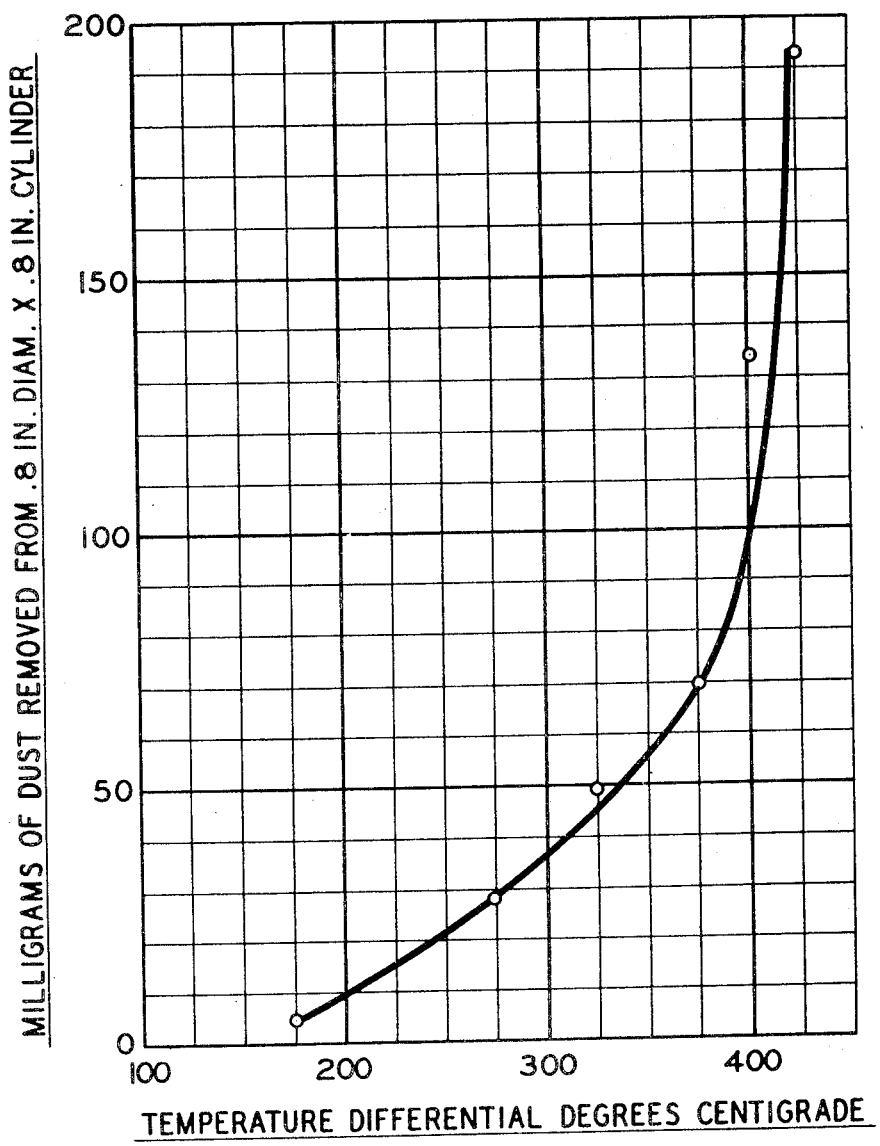

In the drawing,

Fig. 1 illustrates an apparatus suitable for use in practicing the invention; and Fig. 2 is a curve illustrating the effect on the quantity of dust removed from carbon articles of the establishment of various temperature differentials between the articles and water in which they are immersed.

In practicing the method of the invention, a machined carbon article 10 (Fig. 1) to be cleaned is immersed in a suitable liquid 11, such as water, in a vessel 12 which may be of glass and which is provided with a support 13 for the article 10, a closure member 14, and preferably a vapor conduit 15 above the liquid level and a drain cock 16. The article 10 may be maintained in position on the support 13 by a spring clip 17. The vapor conduit 15 is connected to a condenser 18 of conventional construction.

The article 10, having been placed in the apparatus as described, is heated electrically. In a preferred procedure, an induction heating coil 19 is placed about the vessel 12, and a high frequency current is passed through the coil. The carbon article 10 is rapidly heated by induction to a temperature well above that at which the liquid 11 boils, but no heat is otherwise applied to the liquid. A temperature differential is thus established which causes violent ebullition of vapor adjacent to the article 10. The turbulence thus created adjacent to the article causes the removal of dust and loosely held particles not only from its surface portions but also from its pores and crevices. Heated is continued until the desired quantity of dust is removed. The particles removed by this treatment fall by gravity to the bottom of the vessel 12 from which they may be removed from time to time by draining the liquid through the drain cock 16.

As illustrated by Fig. 2 of the drawing, the quantity of dust removed by the treatment of the invention depends in part on the temperature differential established between the article being treated and the liquid in which it is immersed. The curve in Fig. 2 was obtained from tests conducted on carbon cylinders 0.8 inch in diameter and 0.8 inch high. Each cylinder was immersed in water after having been weighed, was heated to establish a predetermined temperature differential, permitted to cool, and again weighed. In these tests about 5 milligrams of dust were removed from a carbon cylinder of these dimensions after it had been heated while immersed in water to establish a temperature differential of 175° C., whereas about 195 milligrams were removed from a cylinder of the same dimensions which had been heated so as to establish a temperature differential of about 425° C. between it and the water in which it was immersed.

Although water is an entirely satisfactory and preferred liquid for use in the practice of the invention, it will be apparent to those skilled in the art that many other easily vaporizable liquids which are inert to carbon may be used satisfactorily and may even be preferred to water in some cases. For example, for the removal of ash constituents from carbon articles, hydrochloric acid may be used. Regardless of what liquid is used the article to be cleaned should be heated to a temperature above that at which the liquid boils or vaporizes rapidly. Ordinarily, the temperature differential ought to be at least about 50° C. but need not exceed about 1000° C. although even higher temperature differentials may be used if necessary, the maximum being just below that at which the pressure of generated vapor is sufficient to cause disintegration of the article being treated. For most purposes a temperature differential of less than 1000° C. will suffice.

The time for which the article being treated is held at a specific temperature also has a bearing on the quantity of loosely held carbon particles that are dislodged from the machined surfaces of the article. In general, heating may be continued for about 5 seconds to two or three minutes, the shorter the heating period and the lower the temperature differential the less dust removed. Thus, for complete removal of damaged surfaces a high temperature differential should be maintained for a fairly long time. For example, at a temperature differential of about 300° C. a graphite article immersed in water was completely cleaned of dust and loose particles in 45 seconds, whereas superficial cleaning was attained in 10 seconds at the same temperature.

Articles which have been treated by the method of the invention are clean and substantially dust-free. They are also substantially free of easily volatilizable impurities such as hydrocarbons, which are removed by the heating step. Furthermore, during the heating step of the invention substantially all adsorbed gases such as nitrogen, carbon dioxide, carbon monoxide, oxygen, and hydrogen are evolved, the degree of gas evolution being greater the higher the temperature employed, and the pores of the article are filled with vapor from the surrounding liquid. When the article cools, this vapor condenses in the pores of the article. The resulting liquid does not react with the carbon and is therefore readily removed by a conventional degassing treatment. The invention thus facilitates degassing by conventional methods.

Although the invention has been described with particular reference to the treatment of carbon electrodes for use in electron discharge devices it may be used to equal advantage in the removal of dust from any carbon article wherein the presence of dust is undesirable whether the article is composed of amorphous carbon or graphitic carbon. In the method of the invention, heating of an article to be treated is preferably accomplished by high frequency induction heating as indicated, but heating may be accomplished by other electrical methods such as resistance heating obtained by passing a current through the article.

I claim:

1. In the method of cleaning machined carbon articles for the removal of dust particles therefrom which comprises the step of subjecting such articles to the action of vapor evolved adjacent to the surfaces thereof to be cleaned, the improvement which comprises immersing a carbon article from which dust is to be removed in a vaporizable liquid medium which is inert to carbon in both the liquid state and the vapor state; heating such article to a temperature 50° C. to 1000° C. above the boiling point of such liquid, without otherwise applying heat to said liquid; thus causing violent ebullition of vapor adjacent to the surfaces of said article to be cleaned; and continuing said heating until the desired cleaning is accomplished.

2. In the method defined in claim 1, the further improvement which comprises heating said article by high frequency electric current.

3. In the method of cleaning machined carbon articles for the removal of dust particles therefrom which comprises the step of subjecting such articles to the action of vapor evolved adjacent to the surfaces thereof to be cleaned, the improvement which comprises immersing a carbon article from which dust is to be removed in water and heating said article to a temperature of 50° C. to 1000° C. above the boiling point of water, without otherwise applying heat to said water, thus causing violent ebullition of steam adjacent to the surfaces of said article to be cleaned; and continuing said heating until the desired cleaning is accomplished.

4. In the method defined in claim 3, the further improvement which comprises heating said article by high frequency electric current.

5. In the method defined in claim 3, the further improvement which comprises heating said article to a temperature at least about 150° C. above the temperature of the surrounding water.

LESTER L. WINTER.

REFERENCES CITED

The following references are of record in the file of this patent:

UNITED STATES PATENTS

| Number | Name | Date |
|---|---|---|
| 1,702,326 | Veronneau | Feb. 19, 1929 |
| 2,060,663 | De Walt | Nov. 10, 1936 |
| 2,118,480 | Somes | May 24, 1938 |
| 2,362,680 | Troupe | Nov. 14, 1944 |
| 2,364,536 | Kent | Dec. 5, 1944 |